(12) United States Patent
Deininger et al.

(10) Patent No.: US 7,776,996 B2
(45) Date of Patent: Aug. 17, 2010

(54) CONTINUOUS METHOD FOR THE PRODUCTION OF POLYAMIDES

(75) Inventors: Jürgen Deininger, Oftersheim (DE); Jürgen Demeter, Ludwigshafen (DE); Thilo Hahn, Freimersheim (DE); Gad Kory, Gaiberg (DE); Oliver Sötje, Mannheim (DE); Peter Zehner, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/588,810

(22) PCT Filed: Feb. 8, 2005

(86) PCT No.: PCT/EP2005/001248

§ 371 (c)(1),
(2), (4) Date: Aug. 9, 2006

(87) PCT Pub. No.: WO2005/078004

PCT Pub. Date: Aug. 25, 2005

(65) Prior Publication Data

US 2007/0161774 A1 Jul. 12, 2007

(30) Foreign Application Priority Data

Feb. 12, 2004 (DE) .................. 10 2004 006 955

(51) Int. Cl.
*C08G 69/08* (2006.01)

(52) U.S. Cl. .............. 528/310; 528/323; 528/324; 528/325; 528/326; 528/327; 528/330

(58) Field of Classification Search ........... 528/310, 528/323–327, 330
See application file for complete search history.

(56) References Cited

U.S. PATENT DOCUMENTS

| | | | |
|---|---|---|---|
| 4,730,041 A | 3/1988 | Hutmacher et al. | |
| 4,816,557 A | 3/1989 | Pipper et al. | |
| 5,151,543 A | 9/1992 | Ziemecki | |
| 5,346,984 A | 9/1994 | Hasegawa et al. | |
| 6,201,096 B1 * | 3/2001 | Marchildon et al. | 528/310 |
| 6,288,207 B1 | 9/2001 | Mohrschladt et al. | |
| 6,316,588 B1 | 11/2001 | Mohrschladt et al. | |
| 6,326,460 B1 | 12/2001 | Mohrschladt et al. | |
| 6,358,373 B1 | 3/2002 | Leemann et al. | |
| 6,359,020 B1 * | 3/2002 | Mohrschladt | 521/49.8 |
| 6,815,527 B2 * | 11/2004 | Bassler et al. | 528/310 |
| 2003/0206835 A1 * | 11/2003 | Donck | 422/132 |
| 2005/0154182 A1 | 7/2005 | Winterling et al. | |

FOREIGN PATENT DOCUMENTS

| | | |
|---|---|---|
| DE | 836938 | 4/1952 |
| DE | 848654 | 9/1952 |
| DE | 0 284 968 | 10/1988 |
| DE | 4312182 | 10/1993 |
| DE | 196 35 077 | 3/1998 |
| DE | 198 08 407 | 9/1999 |
| DE | 198 08 442 | 9/1999 |
| EP | 0 234 295 | 9/1987 |
| EP | 0 345 648 | 12/1989 |
| EP | 1 053 275 | 11/2000 |
| EP | 1 054 919 | 11/2000 |
| WO | WO-99/10408 | 3/1999 |
| WO | WO-99/38907 | 8/1999 |
| WO | WO-00/24808 | 5/2000 |
| WO | WO0208313 * | 1/2002 |
| WO | WO-03/089496 | 10/2003 |

\* cited by examiner

*Primary Examiner*—James Seidleck
*Assistant Examiner*—Gregory Listvoyb
(74) *Attorney, Agent, or Firm*—Connolly Bove Lodge & Hutz LLP

(57) ABSTRACT

A continuous process for producing polyamides, their oligomers or mixtures thereof, if appropriate with further reaction products, comprises reaction of aminonitriles or dinitriles and diamines or mixtures thereof, if appropriate together with further polyamide-forming monomers and/or oligomers, with an aqueous medium composed of aqueous monomer and oligomer extracts obtained from polyamide production by extraction of the polymer with water in a reactor which has a vertical longitudinal axis and through which there is a flow substantially in the longitudinal direction wherein water and/or the aqueous medium are introduced into the reactor at two or more different locations along the vertical longitudinal axis, wherein the aqueous medium is introduced at one or more locations.

12 Claims, No Drawings

CONTINUOUS METHOD FOR THE PRODUCTION OF POLYAMIDES

RELATED APPLICATIONS

This application is a national phase application (under 35 U.S.C. 371) of PCT/EP2005/001248 filed Feb. 8, 2005, which claims benefit to German application 10 2004 006 955.7 filed Feb. 12, 2004.

The present invention relates to a continuous process for producing polyamides, their oligomers or mixtures thereof by using aqueous monomer and oligomer extracts obtained from polyamide production by extraction of the polymer with water.

The polymers formed in polyamide production by polymerization of for example $\epsilon$-caprolactam contain low molecular weight fractions composed of caprolactam and oligomers thereof. In practice, these low molecular weight fractions are removed by extraction with hot water. The caprolactam fraction can be recovered from these extraction waters (aqueous monomer and oligomer extracts), purified and if appropriate reintroduced into the polymerization. It is also possible to add siphoning reagents to convert the oligomers in the extract waters into caprolactam which may likewise be isolated, purified and reused.

Existing processes mostly have the disadvantage that the extract water has to undergo a workup, in multiple stages in some instances, before the entire extract or constituents thereof, especially caprolactam, can be used for renewed polymerization. The processes which envisage removal, workup and recycling of caprolactam have the additional disadvantage that the oligomers in the extract waters are not worked up, but have to be disposed of. Furthermore, the aforementioned processes for recycling extract water assume the use of a process step for hydrolytic polymerization of the extract water concentrate or of a mixture of extract water constituents and caprolactam.

WO 99/38907 concerns a process for recycling extract water, i.e., aqueous monomer and oligomer extracts obtained from polyamide production by extraction of the polymer with water, wherein the aqueous extract solutions can ideally be used in the polymerization of aminonitriles directly without prior workup, concentrating or separation steps. The process for recycling aqueous extracts can be batch operated.

A continuous polymerization process for producing polyamides from aminonitriles is described in WO 00/24808. The reaction in this process is carried out two-phasically in a countercurrent (reactive) distillation column. The column, through which the reactant stream flows downwardly, has water vapor introduced into it at multiple points in the lower region. The addition of water for temperature control in the middle region of the distillation column is likewise possible.

WO 99/10408 concerns a process for preparing polyamides from polyamide monomers which are initially converted into prepolymers. The prepolymer solution is separated in a flasher and a separator which follows the flasher, and the solid prepolymer obtained is crystallized and further converted in a solid state polymerization reactor into a polyamide having a high molecular weight.

Existing processes for producing polyamides from aminonitriles or dinitriles and diamines are still in need of improvement with regard to the hydrolysis of the starting monomers. It is in many cases desirable, for example, to obtain a prepolymer which has a high carboxyl end group content and which is advantageously convertible into a polyamide in subsequent stages.

The present invention has for its object to provide a process for producing polyamides which permits the production of polyamides and their prepolymers having a high carboxyl end group content and avoids the disadvantages of existing processes.

We have found that this object is achieved according to the invention by a continuous process for producing polyamides, their oligomers or mixtures thereof, if appropriate with further reaction products, by reaction of aminonitriles or dinitriles and diamines or mixtures thereof, if appropriate together with further polyamide-forming monomers and/or oligomers, with an aqueous medium composed of aqueous monomer and oligomer extracts obtained from polyamide production by extraction of the polymer with water, in a reactor which has a vertical longitudinal axis and through which there is a flow substantially in the longitudinal direction, wherein water and/or the aqueous medium are introduced into the reactor at two or more different locations along the vertical longitudinal axis, wherein the aqueous medium is introduced at one or more locations. Preferably, aqueous medium only is ducted into the reactor at the at least two different location.

The inventors have found that using aqueous mono-or oligomer extracts from polyamide production by extraction of the polymer with water instead of water alone gives polyamides and especially prepolymers having a high carboxyl end group content when the aqueous medium comprising aqueous monomer and oligomer extracts is introduced into the reactor at two or more different locations along the vertical longitudinal axis. The aqueous medium can be fed at 2 to 4 locations for example. It is possible to add the aqueous medium at preferably up to 20 and more preferably up to 10 positions. In one embodiment, the aqueous medium can be introduced into the reactor at 2 to 20 or 3 to 20 different locations along the vertical longitudinal axis. The individual add locations are spaced apart from each other along the longitudinal direction of the reactor. The feed can take place in the edge region, in the middle or at plural locations in between, based on a cross section through the reactor orthogonally to the longitudinal axis.

The addition of the aqueous medium at plural locations distributed over the course of the reaction gives a more hydrolyzed prepolymer which consequently has a higher carboxyl end group content. Furthermore, the temperature profile in the reactor can be smoothed or uniformized. This is especially possible when the further locations in the continuation of the reactor are fed with aqueous medium which has not been heated up. This makes it possible to check and equalize the exothermism of the hydrolysis reaction. As well as improved hydrolysis, the polyamides or polyamide prepolymers of the process according to the present invention exhibit reduced product damage, such as a minimal amino and carboxyl end group deficit for example, since the reaction management according to the present invention avoids regions of distinctly higher temperature (i.e., hotspots) which can lead to unwanted secondary reactions. The reactor inlet, in contrast, is generally fed with aqueous medium which has been preheated. The distributed feed over the reactor consequently also makes it possible to save energy, since it is not as usual necessary to heat up entire amount of the water. The position and number of different feeds along the continuous flow reactor can be conformed to practical requirements in order for one to obtain a very homogeneous temperature profile throughout the length and the cross section of the reactor and a very substantial hydrolysis in the course of the production of the prepolymer. Appropriate positions along the reactor can be determined by simple tests. The allocation of the amount of the aqueous medium to the individual feed locations is likewise engineered such that a very substantial hydrolysis and a very homogeneous temperature profile result. The fraction of the total aqueous medium fed to the reactor that is fed at the reactor inlet is typically in the range from 35% to 95% by weight and more preferably in the range from 50% to 75% by weight. The remaining fraction of the aqueous medium is allocated to the individual further feed locations. Preferably, the individual locations have water added such that the differences at the individual locations amount to not more than 50% by weight.

The aqueous medium used according to the present invention is obtained from polyamide production by extraction of the polymer with water. The aqueous monomer and oligomer extracts described in WO 99/38907 and DE-A-198 08 442 can be used for example.

The solids content of the aqueous medium used according to the present invention is preferably in the range from 2% to 30% by weight, more preferably in the range from 3% to 15% by weight and especially in the range from 4% to 10% by weight. It is possible for extract waters obtained to be concentrated or diluted with water to achieve the desired level of extractables.

Preferably, at least 50% by weight of the solids in the aqueous medium, based on the solids, are lactams and cyclic oligomeric lactams having 2 to 6 ring members that are derived from the aminonitrile used. The same applies to dinitriles and diamines.

More particularly, the aqueous monomer and oligomer extracts are returned into the polymerization without further workup steps. There is accordingly no need for concentrating, separation or purification.

The solids content of aqueous monomer and oligomer extracts coming directly from the extraction stage are typically in the range from 3% to 20% by weight, preferably in the range from 4% to 15% by weight and especially in the range from 5% to 12% by weight.

In the case of N6, the weight ratio in which caprolactam and its cyclic oligomers having 2 to 5 ring members are present is preferably from 60 to 90:5 to 20:3 to 17:2 to 8:1 to 5, based on caprolactam and respectively 2-, 3-, 4-and 5-rings. For example, the weight ratio can be in the range from 70 to 80:8 to 12:3 to 11:3 to 7:2 to 4. An example comprises weight ratios from about 79: about 10: about 5: about 4: about 2.

An extract water which has been concentrated to about 70% by weight solids content contains the individual structures in a ratio of 50 to 80:1 to 5:0.5 to 2:0.3 to 2:0.02 to 1 for example. Preferred ranges are 60 to 70:2 to 4:0.8 to 1.3:0.6 to 0.9:0.1 to 0.7.

Feeding the above-described aqueous extract continuously along the reaction course in the first reactor at different positions makes it possible to check the exothermism of the reaction and, for example, to set the temperature substantially homogeneously in the entire reactor. Consequently, the temperature can be in the preferred range from 220 to 245° C. for example. This makes it possible to obtain polyamides and polyamide prepolymers having low product damage. The reactor can thus be operated adiabatically, and only the aqueous extract and the amino-nitrile or dinitrile and diamine and if appropriate further polyamide-forming monomers/oligomers at the reactor inlet are generally heated up. Compared with adding all the water at the reactor inlet, a more hydrolyzed prepolymer having a lower product damage is obtained, the energy requirements of the process are lowered and the service life of the hydrolysis performance of any catalyst used is extended. One embodiment of the invention comprises conducting the reaction in the first reactor monophasically in the liquid phase. Especially with this mode of operation it is important to control the exothermism of the reaction, since the heat produced is generally not simple to remove from the reactor.

The reactor used in the process of the present invention has a vertical longitudinal axis and through which there is a flow substantially in the longitudinal direction. Preferably, the reactor is a flow tube, a TVA reactor (as described for example in Ullmann's Encyclopedia of Industrial Chemistry, $6^{th}$ edition, 2000 Electronic release), a multichamber reactor operated co-or countercurrently, or a reactive or nonreactive distillation apparatus.

In one embodiment, the reactor is a multichamber reactor or a flow tube which is fed with aminonitriles or dinitriles and diamines or mixtures thereof, if appropriate together with further polyamide-forming monomers and/or oligomers and a first portion of the aqueous medium at one end and with further portions of the aqueous medium being added in its continuation and from which a reaction mixture comprising a polyamide, its oligomers or mixtures thereof is discharged at its other end.

In a further embodiment, the reactor is a reactive distillation apparatus or the reactor is a flow tube to which is attached a reactive distillation apparatus on the downstream side, in which case, in the reactive distillation apparatus the reaction product is removed from the bottom and ammonia formed and any further low molecular weight compounds formed and water are taken off overhead.

Suitable continuous reactors are known per se. They are described for example in DE-A-196 35 077, DE-A-198 08 407, EP-A-1 053 275, EP-A-1 054 919, WO 99/038907, WO 00/24808.

A reactive distillation apparatus may comprise for example a tray column, a bubble column or a dividing wall column.

The reactors have each been modified such that they permit introduction of the aqueous medium at two or more different locations along the vertical longitudinal axis. Appropriate reactor modifications will be known to one skilled in the art.

In one embodiment of the invention, the process takes place in a reactor (1) having a vertically disposed longitudinal axis wherein, in the reactor (1), the reaction product is removed from the bottom and ammonia formed and any further low molecular weight compounds formed and water are taken off overhead (2, wherein the reactor (1)

comprises at least two chambers (4) arranged above one another in the longitudinal direction, wherein the chambers (4) are separated from one another by liquid-tight bottom plates (5), every chamber (4) is connected via a liquid overflow (6) to the immediately underlying chamber (4) and a liquid product stream is taken off via the liquid overflow (6) of the bottommost chamber (4), the gas space (7) above the liquid surface in every chamber (4) is connected to the chamber (4) located immediately above it by one or more guide tubes (8) which opens, or which each open, into a gas distributor (9) having openings (11) for the exit of gas below the liquid surface, and is also provided with at least one guide plate (12) which is arranged vertically around each gas distributor (9) and whose upper end is below the liquid surface and whose lower end is above the liquid-tight bottom plate (5) of the chamber (4) and which divides each chamber (4) into one or more spaces (13) into which gas flows and one or more spaces (14) into which gas does not flow.

The gas distributor (9) of reactor (1) can have a siphonlike configuration in the form of a hood (10) which is closed at the top.

The hood of the siphonlike gas distributor (9) can be open in its lower part.

The hood or hoods (1) of the siphonlike gas distributor or distributors (9) can be formed of two or more interconnected parts which in cross section are arranged in the form of a cross and/or parallel or concentrically or radially.

The number and size of the openings (11) for the exit of gas and also their distance from the liquid surface in the chamber (4) can be determined such that the pressure drop of the gaseous stream in the gas distributor (9) is in the range from 0.5 to 50 mbar.

The openings (11) for the exit of gas are each preferably disposed at the same height relative to one another.

The openings (11) for the exit of gas can be disposed in the lower part of the hood or hoods (1) at a 1 to 15 cm distance from the lower end of the hood or hoods (10).

The guide plate or plates can each be spaced from the liquid surface and from the bottom plate of the chamber (4) such that substantially no throttling of the flow of liquid by the guide plate or plates (12) occurs.

The at least one guide plate (12) vertically disposed about each gas distributor (9) can be constructed in the form of a push-in tube.

The guide plate or plates and the gas distributor or distributors (9) can be disposed such that the cross-sectional area in which no gas flows is in the range from 10% to 80%, preferably in the range from 40% to 60% and more preferably about 50% of the sum total of cross-sectional areas in which gas flows and in which gas doesn't flow.

One or more and preferably all chambers (4) of the reactor (1) may have been fitted with a solid catalyst, especially as a bed of solid particles or in the form of catalyst-coated ordered packing, for example of a monolith.

An ion exchange resin may be installed in one or more and preferably in all chambers (4).

Reactor (1) constitutes an apparatus which without moving parts, by means of an air-lift circulation of the liquid, ensures excellent mixing of phases in the case of multiphase reactions and a virtually constant composition of the reaction mixture over the total volume in each chamber, i.e., both over its cross section and also, in particular, over the height of the liquid, with, at the same time, simple separation of liquid and gaseous phases after the reaction is complete. The exit of gas from the gas distributor into the liquid space between the gas distributor and the guide plate or plates arranged vertically around the gas distributor reduces the hydrostatic pressure in this liquid space relative to the liquid space through which gas does not flow, resulting in a pressure gradient which is converted into kinetic energy. This pressure gradient drives the air-lift circulation in the form of a flow which is directed upward in the space through which gas flows, i.e., in the space between the gas distributor and the guide plate or plates arranged around the gas distributor or distributors, is deflected by the guide plate or plates in the region above the uppermost end of the guide plate or plates and below the liquid surface, flows through the liquid space through which gas does not flow outside the guide plate or plates from the top downward and above the liquid-tight bottom plate of the chamber and below the bottommost end of the guide plate or plates is once again deflected into an upwardly directed flow, thus closing the loop.

The reactor is an apparatus having a vertically disposed longitudinal axis, i.e., an upright apparatus supplied with one or more liquid, liquid/solid, gaseous/liquid or gaseous/liquid/ solid reactant streams in its upper region and with a gaseous stream—reactant and/or inert gas—in its lower region, i.e., having a countercurrent regime for the liquid, liquid/solid and the gaseous streams.

The reactor (1) is constructed of a plurality of chambers, preferably arranged one above the other.

The number of chambers can advantageously be not more than 200, preferably not more than 50 and especially not more than 10.

The number of chambers can advantageously be not less than 2 and especially not less than 3.

The geometry of the reactor is frequently cylindrical, but other geometries are also possible.

The chambers are separated from one another by liquid-tight bottom plates, with each chamber being connected via a liquid overflow to the chamber located immediately underneath. The liquid overflow can be configured, for example, in the form of a tube or a shaft and can be located either within the reactor or outside the reactor. In particular, the liquid overflows of two successive chambers can be located on mutually opposite sides of the reactor. A liquid product stream is taken off from the bottommost chamber via its liquid overflow. The bottommost chamber of the reactor (1), the so-called bottom region, can be subdivided into two or more chambers. These at least two chambers can be disposed side by side or on top of each other or on top of each other and side by side.

In a preferred embodiment, a portion of the product stream withdrawn from the bottom region of reactor (1) is fed in liquid form to a heat exchanger, this heat exchanger converts some or all of the water in the product stream into the gaseous state and the mixture leaving the heat exchanger is fed to reactor (1). It is preferable that the polyamides, oligomers or their mixtures which are obtained according to the process of the present invention can be withdrawn from reactor (1), especially in the bottom region, as a liquid product.

In another preferred embodiment, a portion or all of the product stream withdrawn from the bottom region of reactor (1) is fed in liquid form to a heat exchanger, this heat exchanger converts some or all of the water present in the product stream into the gaseous state, the gaseous water is fed to reactor (1) and the liquid product leaving the heat exchanger is obtained as a product of value.

In another preferred embodiment, product from at least one of the chambers in the bottom region of reactor (1) is fed in liquid form to a heat exchanger, this heat exchanger converts some or all of the water in the product stream into the gaseous state and the mixture leaving the heat exchanger is fed to reactor (1). It is preferable that the polyamides, oligomers or their mixtures which are obtained according to the process of the present invention can be withdrawn from reactor (1), especially in the bottom region, as a liquid product.

In a further preferred embodiment, product from at least one of the chambers in the bottom region of reactor (1) is fed in liquid form to a heat exchanger, this heat exchanger converts some or all of the water in the product stream into the gaseous state, the gaseous water is fed to reactor (1) and the liquid product leaving the heat exchanger is obtained as a product of value.

The heat exchanger used in these preferred embodiments can be situated inside reactor (1) or outside reactor (1) or partly inside, partly outside reactor (1). The heat exchanger can further comprise one apparatus or a plurality of distinct apparatuses.

The gas space above the liquid surface in each chamber is connected to the chamber located directly above it by one or more guide tubes which opens or which each open into a gas distributor with openings for the exit of gas below the liquid surface. There are in principle no restrictions with regard to the number and arrangement of the guide tubes: it is equally possible to provide a single central guide tube or a plurality of guide tubes distributed over the cross section of the reactor. It is likewise possible to provide a plurality of separate gas distributors each supplied with gas via one or more guide tubes for each chamber instead of a single gas distributor. A gaseous stream is introduced from outside the reactor and/or from the bottom region into the gas distributor of the penultimate chamber of the reactor via one or more guide tubes.

It is thus equally possible to provide a single gas distributor supplied with gas via one or more guide tubes, or a plurality of gas distributors which are not inter-connected and are each supplied with gas via one or more guide tubes.

There are in principle no restrictions with regard to the gas distributors which can be used for the purposes of the present invention: the important thing is that the gas distributor allows the gas supplied to it via the guide tube or tubes to exit from the gas space of the chamber located immediately beneath below the liquid surface of the chamber in which the gas distributor is located. The gas should preferably exit very uniformly. As gas distributor, it is in principle possible to use any commercial gas introduction device, for example gas distributors in the form of tubes which are equipped with openings for exit of the gas and may be, for example, arranged horizontally, i.e., in a plane parallel to the liquid-tight bottom plate of the chamber. It is also possible to provide ring-shaped gas distributors. However, the openings for the exit of gas always have to be located below the liquid surface in the chamber, preferably at a distance from the liquid surface of at least 10% of the total height of liquid in the chamber, preferably at least 30% and more preferably at least 50%. It has been found that a particularly favorable immersion depth on the part of the openings for the exit of gas below the liquid surface in the chamber is at least 50 mm.

In a preferred variant, the gas distributor or distributors has or have a siphonlike configuration in the form of a hood which is closed at the top and has openings for the exit of gas in its lower part.

The hood can be completely closed except for openings for the guide tube or tubes for supply of gas and the openings for exit of gas in its lower part.

It is likewise possible, however, for the hood to be open in its lower part.

The upper closed end of the hood can be below the liquid surface, but it can also extend above the liquid surface into the gas space.

The hood of the siphonlike gas distributor can in principle have any geometric shape; it is possible, for example, for it to comprise a plurality of parts which are connected to one another and are in cross section preferably arranged in the form of a cross and/or parallel or concentrically or radially.

The number, cross section and distance from the liquid surface in the chamber of the openings for the exit of gas are preferably such that the pressure drop experienced by the gaseous stream in the gas distributor is in the range from 0.1 to 50 mbar.

The openings for the gas distributor are preferably located at the same height relative to one another.

They can in principle have any geometric shape, for example circular, triangular or in the form of slots.

The central line of the openings is preferably at a distance from about 1 cm to 15 cm from the lower end of the hood. Alternatively, it is also possible for the lower end of the hood to be provided with a zigzag edge instead of openings. In a further alternative, it is possible for the lower end of the hood to be in the form of a ring distributor.

Arrangement of the openings at different heights relative to one another can be advantageous for an operation using two or more load ranges.

The height of the openings for the exit of gas is chosen as required depending on the specific reaction to be carried out in the reactor such that, first, a sufficient mass transfer area is available for the specific gas/liquid or gas/liquid/solid reaction and, secondly, sufficient impetus for the air-lift circulation of the liquid is made available.

Around each gas distributor in the reactor of the present invention there is arranged at least one vertical guide plate whose upper end is below the liquid surface in the chamber, which is at a distance from the bottom plate of the chamber and which divides each chamber into one or more spaces into which gas flows and one or more spaces into which gas does not flow.

The guide plate, in a preferred embodiment, can be constructed as a push-in tube having the shape of a hollow cylinder. However, it is also possible, for example, for it to have the shape of a simple flat plate.

The at least one guide plate is at a distance from the liquid surface and from the bottom plate of the chamber preferably such that substantially no throttling of the liquid flow by the guide plate occurs. The distances of the guide plate or guide plates from the liquid surface and also from the bottom plate of the chamber are thus preferably determined such that the flow velocity of the liquid is not altered or altered only slightly by the deflection caused by the guide plate.

The total height of the guide plate is in principle subject to no restrictions. It can be dimensioned appropriately, in particular as a function of the desired residence time per chamber while at the same time ensuring adequate mixing.

The process of the present invention can be carried out in one or more stages.

The process according to the present invention comprises in one embodiment of the invention the following stages:

(1) reacting aminonitriles or dinitriles and diamines or mixtures thereof, if appropriate together with further polyamide-forming monomers and/or oligomers with the aqueous medium in the reactor at a temperature from 90 to 400° C. preferably 180 to 310° C., and a pressure from 0.1 to 35 $10^6$ Pa, preferably 1 to $10 \times 10^6$ Pa to obtain a reaction mixture, (2) further reacting the reaction mixture at a temperature from 150 to 400° C., preferably 200 to 300° C. and a pressure which is lower than the stage 1 pressure, wherein the temperature and the pressure are chosen such that a first gas phase and a first liquid phase are obtained and the first gas phase is separated from the first liquid phase, and (3) admixing the first liquid phase with a gaseous or liquid phase comprising water or an aqueous medium at a temperature from 90 to 370° C., preferably 200 to 300° C. and a pressure from 0.1 to $30 \times 10^6$ Pa to obtain a product mixture.

The process may in addition to or in lieu of stage 3 comprise the following stage:

(4) postcondensing the product mixture at a temperature from 200 to 280° C. and a pressure which is lower than the stage 3 pressure, if stage 3 is carried out, wherein the temperature and the pressure are chosen such that a second gaseous phase, which comprises water and ammonia, and a second liquid phase, which comprises the polyamide, are obtained.

Metal oxide catalysts in the form of a fixed bed can be utilized in the reactor or in stage 1 or in stage 3 or not only in the reactor or stage 1 but also in stage 3.

In general, the reaction in the reactor can be carried out in the presence of fixed bed catalysts, more preferably Brönsted-acidic fixed bed catalysts.

The aminonitrile in the mixture can be in principle any aminonitrile, i.e., any compound having both at least one amino group and at least one nitrile group. ω-Aminonitriles are preferred, especially ω-aminoalkyl nitrites having 4 to 12 carbon atoms and more preferably 4 to 9 carbon atoms in the alkylene moiety, or an aminoalkylaryl nitrile having 8 to 13 carbon atoms, preferred aminoalkylaryl nitrites being aminoalkylaryl nitrites which have an alkylene group having at least one carbon atom between the aromatic unit and the amino and nitrile group. Especially preferred aminoalkylaryl nitrites are those which have the amino group and the nitrile group in the 1,4 position relative to each other.

The ω-aminoalkyl nitrile used is preferably a linear ω-aminoalkyl nitrile in which the alkylene moiety (—CH$_2$—) preferably contains 4 to 12 carbon atoms, more preferably 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane and more preferably 6-aminocapronitrile.

6-Aminocapronitrile is customarily obtained by hydrogenation of adiponitrile according to known processes, described for example in DE-A 836 938, DE-A 848,654 or U.S. Pat. No. 5,151,543.

Of course, it is also possible to use mixtures of a plurality of aminonitriles or mixtures of an aminonitrile with further comonomers, such as caprolactam or the below-defined mixture.

In a particular embodiment, especially if copolyamides or branched or chain-extended polyamides are to be prepared, the following mixture is used instead of pure 6-aminocapronitrile:

from 50 to 99.99, preferably from 80 to 90, % by weight of 6-aminocapronitrile, from 0.01 to 50, preferably from 1 to 30, % by weight of at least one dicarboxylic acid selected from the group consisting of aliphatic $C_4$-$C_{10}$-α,ω-dicarboxylic acids, aromatic $C_8$-$C_{12}$-dicarboxylic acids and $C_5$-$C_8$-cycloalkanedicarboxylic acids, from 0 to 50 preferably from 0 to 30% by weight of an α,ω-diamine having from 4 to 10 carbon atoms, from 0 to 50 preferably from 0 to 30% by weight of an α,ω-$C_2$-$C_{12}$-dinitrile, and from 0 to 50 preferably from 0 to 30% by weight of an α,ω-$C_5$-$C_{12}$-amino acid or of the corresponding lactam, from 0 to 10% by weight of at least one inorganic acid or salt thereof, the individual weight percentages adding up to 100%.

Suitable dicarboxylic acids include aliphatic $C_4$-$C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$-$C_{12}$-dicarboxylic acids such as terephthalic acid and also $C_5$-$C_8$-cycloalkanedicarboxylic acids such as cyclohexanedicarboxylic acid.

Suitable α,ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 66 salt.

The α,ω-$C_2$-$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkylene-arylene or alkylarylenes.

The α,ω-$C_5$-$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid and 12-aminododecanoic acid, preferably 6-aminohexanoic acid, or internal amides thereof, especially caprolactam.

Useful starting materials for the process of the present invention further include mixtures with aminocarboxylic acid compounds of the general formula I

$$R^2R^3N—(CH_2)_m—C(O)R^1 \qquad (I)$$

where $R^1$ is —OH, —O$C_{1-12}$-alkyl or —N$R^2R^3$, where $R^2$ and $R^3$ are independently hydrogen, $C_{1-12}$-alkyl or $C_{5-8}$-cycloalkyl, and m is 3, 4, 5, 6, 7, 8, 9, 10, 11 or 12.

Particularly preferred aminocarboxylic acid compounds are those in which $R^1$ is OH, —O—$C_{1-4}$-alkyl such as —O-methyl, —O-ethyl, —O-n-propyl, —O-i-propyl, —O-n-butyl, —O-sec-butyl, —O-tert-butyl and —N$R^2R^3$ such as —NH$_2$, —NHMe, —NHEt, —NMe$_2$ and —NEt$_2$, and m is 5.

Very particular preference is given to 6-aminocaproic acid, methyl 6-aminocaproate, ethyl 6-aminocaproate, 6-amino-N-methylcaproamide, 6-amino-N,N-dimethylcaproamide, 6-amino-N-ethylcaproamide, 6-amino-N,N-diethylcaproamide and 6-aminocaproamide.

The starting compounds are commercially available or preparable for example as described in EP-A 0 234 295 and Ind. Eng. Chem. Process Des. Dev. 17 (1978) 9-16.

It is also possible to use any desired mixtures of the aforementioned compounds, aminocarboxylic acid compounds, lactams, diamines and diacids or salts thereof.

The reaction in the first stage can be carried out without a catalyst or in the presence of a metal oxide catalyst. In what follows, the reaction conditions are described without catalyst and with catalyst (in brackets).

According to the invention, the first stage (stage 1) involves heating an aminonitrile with water at a temperature from about 100(90) to about 400(400)° C., preferably about 200(180) to about 350(310)° C., especially about 240(220) to about 290(270)° C., to which a pressure from about 0.1 to about 35(15)×10$^6$ Pa, preferably about 1(1) to about 15(10)×10$^6$ Pa, especially about 4(4) to about 11(9)×10$^6$ Pa, is set. In this stage, the pressure and the temperature can be adjusted relative to each other in such a way as to obtain a liquid phase and a gaseous phase. Preferably, the reaction mixture should be present as a single liquid phase.

According to the invention, water or aqueous extract is used in total in a molar ratio of aminoalkyl nitrile to water within the range from 1:1 to 1:30(1:10), particularly preferably within the range from 1:2 to 1:10(1:8), very particularly preferably within the range from 1:2 to 1:8(1:6), preference being given to the use of water or aqueous extract in excess, based on the aminoalkyl nitrile used.

In this embodiment, the liquid phase corresponds to the reaction mixture, whereas the gaseous phase is separated off. As part of this stage, the gaseous phase can be separated from the liquid phase at once, or the synthesis mixture forming within this step can be present in two-phase form: liquid/gaseous. Of course, the pressure and temperature can also be adjusted relative to each other in such a way that the synthesis mixture is present as a single liquid phase.

The removal of the gas phase can be effected by the use of stirred or unstirred separating vessels or vessel batteries and by the use of evaporator apparatus, for example by means of circulatory evaporators or thin-film evaporators, such as by film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

In a further embodiment, the reactor of the first stage is provided with packing elements which limit any axial backmixing of the reactants. As a result, the ammonia-gas liberated in the reactor, predominantly directly after entry into the reactor, reaches the gas phase at the top of the reactor by the most direct route. Disruption caused by the flow profile in the further continuation of the reactor by ascending gas bubbles or convection is therefore minimal.

As regards the residence time of the synthesis mixture in the first step, there are no restrictions whatsoever; however, it is generally set within the range from about 10 minutes to about 10 hours, preferably within the range from about 30 minutes to about 6 hours.

Although there are no restrictions whatsoever concerning the degree of conversion of nitrile groups in stage 1 either, economic reasons especially dictate that the conversion of nitrile groups in stage 1 be generally not less than about 70 mol %, preferably at least about 95 mol %, and especially within the range from about 97 to about 99 mol %, based in each case on the moles of aminonitrile used.

The nitrile group conversion is customarily determined by means of IR spectroscopy (CN stretching vibration at 2247 wavenumbers), NMR or HPLC, preferably by IR spectroscopy.

In a further preferred embodiment, the aminonitrile/water mixture is continuously heated with the aid of a heat exchanger and the mixture thus heated is introduced into a reaction vessel heated to the same temperature, preferably into a tube which, if desired, may include internals such as Sulzer mixing elements to avoid back-mixing. Of course, the aminonitrile and the water can also be heated up separately.

Nor is it ruled out according to the present invention to conduct the reaction in stage 1 in the presence of oxygen-containing phosphorus compounds, especially phosphoric acid, phosphorous acid and hypophosphorous acid and their alkali metal and alkaline earth metal salts and ammonium salts such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of ω-aminonitrile to phosphorus compounds is selected within the range from 0.01:1 to 1:1, preferably within the range from 0.01:1 to 0.1:1.

It is further advantageous to use known metal oxides, such as titanium dioxides, zirconium oxide, aluminum oxide, lanthanum oxide, magnesium oxide, etc., preferably a Brönsted acid catalyst selected from a beta zeolite catalyst, sheet-silicate catalyst or a titanium dioxide catalyst, for heterogeneous catalysis in the individual process steps in order that the conversion, especially of the nitrile groups, may be boosted. Catalysts of this type are described for example in WO 03/089496 or in the prior art cited therein. Preference is given to titanium dioxides, especially titanium dioxides comprising from 70 to 100% by weight of anatase and from 0 to 30% by weight of rutile in which up to 40% by weight of the titanium dioxide may be replaced by other oxides such as tungsten oxide. For pure starting materials (aminonitrile) preference is given to using a titanium dioxide having a high anatase content. The catalyst preferably has a pore volume of from 0.05 to 5 ml/g, particularly preferably from 0.2 to 0.5 ml/g. The cutting hardness can be in the range of small values, such as 2 N to 10 N, medium values, such as greater than 10 N to 20 N, or else high values such as greater than 20 N or greater than 25 N. The BET surface area is preferably more than 5 $m^2/g$ and more preferably more than 15 $m^2/g_x$ (DIN 66131).

The catalysts may be prepared from commercially available $TiO_2$ powders. When tungsten oxide is used, up to 40% by weight, preferably up to 30% by weight and more preferably from 15% to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff. The metal oxides can be used in any desired suitable form. They are preferably used in the form of pellets, extrudates or other shaped articles. Particular preference is given to extrudates from 1 to 6 mm in average diameter and from 5 to 30 mm in average length. The pellets and extrudates can be used alone or combined with metallic packings such as Raschig rings. A mixture of pellets and shaped articles may be present, or a sequence of layers of metal oxide and shaped articles may be present.

The abovementioned metal oxides are not used in stage 4, but they can be used in stages 1 to 3 and preferably 1 and 3, in which case the use in stage 1 is particularly preferred.

According to the invention, the reaction mixture obtained in the first step is further reacted in stage 2 at a temperature from about 200(150) to about 400(350)° C., preferably at a temperature within the range from about 210(200) to about 330(300)° C., especially within the range from about 230 (230) to about 290(270)° C., and a pressure which is lower than the pressure in stage 1. The pressure in the second step is preferably at least about $0.5 \times 10^6$ Pa lower than the pressure in stage 1, and generally the pressure will be within the range from about 0.1 to about $45 \times 10^6$ Pa, preferably within the range of about 0.5 to about $15 \times 10^6$ Pa, especially within the range from about 2 to about $6 \times 10^6$ Pa.

In stage 2, the temperature and the pressure are chosen so as to obtain a first gas phase and a first liquid phase and the first gas phase is separated from the first liquid phase.

The first gaseous phase, which consists essentially of ammonia and water vapor, is generally removed continuously by means of a distillation apparatus, such as a distillation column. Any organic constituents of the distillate coremoved in the course of this distillation, predominantly unconverted aminonitrile, can be wholly or partly recycled into stage 1 and/or stage 2.

The residence time of the reaction mixture in stage 2 is not subject to any restrictions whatsoever, but is generally within the range from about 2 minutes to about 5 hours, preferably within the range from about 10 minutes to about 1 hour.

The product line between the first and second stages optionally contains packing elements, for example Raschig rings or Sulzer mixing elements, which facilitate a controlled expansion of the reaction mixture into the gas phase.

In stage 3, the first liquid phase is admixed with a gaseous or liquid phase comprising an aqueous medium, preferably with water or water vapor or extract. This is preferably done continuously. The amount of water or extract added (as liquid) is preferably within the range from about 10 to about 500 ml, more preferably within the range from about 20 to about 150 ml, based on 1 kg of the first liquid or first solid phase or of the mixture of first liquid and first solid phase. This addition of water or extract primarily compensates the water losses incurred in stage 2 and furthers the hydrolysis of acid amide groups in the synthesis mixture. This results in a further advantage of this invention, that the mixture of the starting materials as used in stage 1 can be used with a small excess of water only.

In another embodiment of the invention, stage 3 can be carried out using aqueous extracts having a higher extractables content of up to 85%. If desired, the highly concentrated aqueous extract may have caprolactam added to it prior to introduction into stage 3 to improve the solubility of caprolactam oligomers and to prevent the deposition of oligomers and thus the plugging of apparatus.

The gaseous or liquid phase comprising water or aqueous extracts is preferably preheated in a heat exchanger before being introduced into stage 3 and then mixed with the first liquid phase. The reactor may optionally be fitted with mixing elements which further the mixing of the components.

The organic fraction of the removed gas phase from stage 2 can likewise be recycled into the 3rd stage.

This recycling of the organic phase customarily takes place in aqueous form.

Stage 3 can be operated at a temperature from 150 to 370° C. and a pressure from 0.1 to $30 \times 10^6$ Pa. If a catalyst bed is present, the conditions applying to stage 1 may be employed.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step can be identical with those of stage 1, discussed above.

In a preferred embodiment, the two-phase procedure is carried out by subjecting the reactor of the first stage to downward flow, in which case this reactor is preferably again equipped with catalyst and/or packing elements which limit any axial back-mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

The residence time of this step is likewise not subject to any restrictions, but economic reasons generally dictate a range from about 10 minutes to about 10 hours, preferably from about 1 to about 8 hours, particularly preferably from about 1 to 6 hours.

The product mixture obtained in stage 3 can be further processed as described below.

In a preferred embodiment, the product mixture of stage 3 is subjected to a postcondensation in a fourth stage at temperatures from about 200 to about 350° C., preferably at temperatures from about 220 to 300° C., especially from about 250 to 270° C. Stage 4 is carried out at a pressure which is below the pressure of stage 3 and is preferably within the range from about 5 to $1000 \times 10^3$ Pa, more preferably within the range from about 10 to about $300 \times 10^3$ Pa. In the context of this step, the temperature and pressure are selected so as to obtain a second gas phase and a second liquid or solid phase or a mixture of second liquid and second solid phase which each comprise the polyamide.

The postcondensation of stage 4 is preferably carried out in such a way that the relative viscosity (measured at a temperature of 25° C. and a concentration of 1 g of polymer per 100 ml in 96% strength by weight of sulfuric acid) of the polyamide assumes a value within the range from about 1.6 to about 3.5.

In a preferred embodiment, any water present in the liquid phase can be expelled by means of an inert gas such as nitrogen.

The residence time of the reaction mixture in stage 4 depends especially on the desired relative viscosity, the temperature, the pressure and the amount of water added in stage 3.

The product line between stage 3 and stage 4 may optionally contain packing elements, for example Raschig rings or Sulzer mixing elements, which allow a controlled expansion of the synthesis mixture in the gas phase.

In a further embodiment of the invention, stage 3 may be dispensed with and the polyamide prepared by carrying out stages (1), (2) and (4).

This variant—with catalyst—is preferably carried out as follows:

In stage 1, at least one aminoalkyl nitrile is heated with an excess of extract water to a temperature within the range from about 250 to about 350° C. and a pressure of from about 4 to $30 \times 10^6$ Pa, the pressure and temperature being adjusted to each other in such a way that the synthesis mixture is present as a single liquid phase and the nitrile group conversion being not less than 95 mol %, based on the moles of aminoalkyl nitrile used, to obtain a reaction mixture.

The reaction mixture is treated in stage 2 at a temperature within the range from about 220 to about 300° C. and a pressure within the range from about 1 to about $7 \times 10^6$ Pa, the pressure in the second step being at least $0.5 \times 10^6$ Pa lower than in stage 1. At the same time, the resulting first gas phase is separated from the first liquid phase.

The first liquid phase obtained in stage 2 is treated in stage 3 at a temperature within the range from about 220 to 300° C. and a pressure within the range from about 10 to about $300 \times 10^3$ Pa, the resulting second, water-and ammonia-comprising gas phase being separated from the second liquid phase. Within this stage, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

If metal oxide catalysts are employed, the above-described low temperatures and pressures can be used.

Furthermore, in the context of the process of the invention, it is also possible to carry out a chain-extending or branching or a combination thereof. For this purpose, polymer branching or chain-extending substances known to a person skilled in the art are added in the individual stages. These substances are preferably added in stage 3 or 4.

Usable substances are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

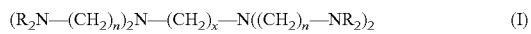

where

R is H or $—(CH_2)_n—NR^1{}_2$, where
$R^1$ is H or $—(CH_2)_n—NR^2{}_2$, where
$R^2$ is H or $—(CH_2)_n—NR^3{}_2$, where
$R^3$ is H or $—(CH_2)_n—NH_2$,
n is an integer from 2 to 6, and
x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a $—(CH_2)_n—NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanin, naphthalocyanin. Preference is given to 3,5,3',5'-biphenyltetracarboxylic acid-phthalocyanine, naphthalocyanine, 3,5,5', 5'-biphenyltetracarboxylic acid, 1,3,5,7-naphthalenetetracarboxylic acid, 2,4,6-pyridinetricarboxylic acid, 3,5,3'5'-bipyridyltetracarboxylic acid, 3,5,3'5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 μmol/g of polyamide, preferably from 1 to 35, particularly preferably 1 to 20, μmol/g of polyamide. The substances are preferably present in an amount from 3 to 150, particularly preferably from 5 to 100, especially from 10 to 70, μmol of equivalents/g of polyamide. The equivalents are based on the number of functional amino groups or carboxylic acid groups.

Difunctional carboxylic acids or difunctional amines are used as chain extenders. These have 2 carboxylic acid groups which can be reacted with amino groups, or 2 amino groups which can be reacted with carboxylic acids. The difunctional carboxylic acids or amines, as well as the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, Laromin. Branched aliphatic diamines are likewise usable, an example being Vestamin TMD (trimethylhexamethylenediamine, from Hüls AG). In addition, the diamines can also be aromatic-aliphatic, it being possible to use n-xylylenediamine for example. Entire amines can each be substituted by $C_{1-12}$-alkyl, preferably $C_{1-14}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks are preferably used in amounts from 1 to 55, particularly preferably from 1 to 30, especially from 1 to 15, μmol/g of polyamide.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284968, for example). The low molecular weight constituents obtained in this aftertreatment, such as caprolactam, linear caprolactam oligomer and cyclic caprolactam oligomer, can be recycled into the first and/or second and/or third stage.

The starting mixture and the synthesis mixture can be admixed in all stages with chain regulators such as aliphatic and aromatic carboxylic and dicarboxylic acids and catalysts such as oxygen-containing phosphorus compounds in amounts within the range from 0.01 to 5% by weight, preferably within the range from 0.2 to 3% by weight, based on the amount of polyamide-forming monomers and aminonitriles used. Suitable chain regulators include for example propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth step. Particular preference is given to using fillers and additives whenever the synthesis or polymer mixture will not encounter fixed bed catalysts in the rest of the processing. One or more impact-modified rubbers may be present in the compositions as additives in amounts from 0 to 40% by weight, preferably from 1 to 30% by weight, based on the entire composition.

The examples which follow illustrate the invention:

EXAMPLE

A flow pipe 4.5 m in overall length and 10 cm in internal diameter, which is packed with titanium dioxide catalyst and is operated adiabatically at 80 bar, is continuously fed, from the bottom end, with an inlet stream of 20 kg/h of ACN and 14.6 kg/h of extract water consisting of 91% by weight of water, 8% by weight of caprolactam monomer and 1% by weight of caprolactam dimer. The temperature of the inlet stream is 208° C. A continuous stream of 5.3 kg/h of extract water (similar composition to the extract water of the inlet stream) having a temperature of 85° C. is introduced at a reactor height of 1 m. There is a further side feed of extract water at a reactor height of 2 m. In this case, the metering rate is 2.1 kg/h coupled with the same composition and temperature for the extract water as for the 1st side metering.

An N6 prepolymer having a carboxyl end group concentration of 25.3% based on the concentration of amino end groups is obtained at the end of the flow tube at a rate of 23 kg/h, based on the sum total of all organic constituents.

Comparative Example 1

Comparative Example 1 is carried out in the same way as Example 1 except there is no side metering of extract water, i.e., the inlet stream comprises just 20 kg/h of ACN and 22 kg/h of extract water consisting of 91% by weight of water, 8% by weight of caprolactam monomer and 1% by weight of caprolactam dimer. The temperature of the inlet stream is 208° C. An N6 prepolymer having a carboxyl end group concentration of 15.4% based on the concentration of amino end groups is obtained at the end of the flow tube at a rate of 23 kg/h, based on the sum total of all organic constituents.

Comparative Example 2

Comparative Example 2 is carried out in the same way as Example 1 except that completely ion-free water is used instead of extract water. Accordingly, the inlet stream comprises 22 kg/h of ACN and 13.3 kg/h, of completely ion-free water. Completely ion-free water is continuously supplied at a rate of 4.8 kg/h for the 1st side feed and at a rate of 1.9 kg/h for the 2nd side feed. An N6 prepolymer having a carboxyl end group concentration of 17.2% based on the concentration of amino end groups is obtained at the end of the flow tube at a rate of 23 kg/h, based on the sum total of all organic constituents.

Comparative Example 3

Comparative Example 3 is carried out in the same way as Example 1 except that completely ion-free water is used instead of extract water. Nor is there any side metering into the flow reactor. Accordingly, the inlet stream comprises 22 kg/h of ACN and 20 kg/h of completely ion-free water. The inlet temperature is again 208° C. An N6 prepolymer having a carboxyl end group concentration of 14.5% based on the concentration of amino end groups is obtained at the end of the flow tube at a rate of 23 kg/h, based on the sum total of all organic constituents.

This example illustrates that the process of the present invention, which is based on the use of extract water instead of completely ion-free water and on the side metering thereof, provides polyamides and polyamide prepolymers having a higher carboxyl end group content than prior art processes.

The invention claimed is:

1. A continuous process for producing polyamides, their oligomers, or mixtures thereof, and optionally further reaction products, comprising
reacting
(A) aminonitriles or dinitriles and diamines or mixtures thereof, optionally together with further polyamide-forming monomers and/or oligomers,
with
(B) an aqueous medium composed of aqueous monomer and oligomer extracts obtained from polyamide production by extraction of the polymer with water,
in a reactor which has a vertical longitudinal axis and through which there is a flow substantially in the longitudinal direction,
wherein
said aqueous medium (i) has a solids content in the range of from 2% to 30% by weight and (ii) is introduced into the reactor at a first location and one or more additional locations along the vertical longitudinal axis,
wherein
said one or more additional locations are located at least 1 meter higher on said reactor than said first location,
from 35% to 95% by weight of the total amount of said aqueous medium is introduced into said reactor at said first location or at one of said one or more additional locations, and
the temperature of the aqueous medium introduced at said one or more additional locations is lower than that of the aqueous medium introduced at said first location.

2. The process of claim 1, wherein said aqueous medium is introduced into said reactor at three or more different locations along said vertical longitudinal axis.

3. The process of claim 1, wherein said reactor is a flow tube, a TVA reactor, a multichamber reactor operated co-or countercurrently, or a reactive or nonreactive distillation apparatus.

4. The process of claim 3, wherein said reactor is a multichamber reactor or a flow tube which is fed with aminonitriles or dinitriles and diamines or mixtures thereof, optionally together with further polyamide-forming monomers and/or oligomers and a first portion of said aqueous medium at one end and with further portions of the aqueous medium being added in its continuation and from which a reaction mixture comprising a polyamide, its oligomers or mixtures thereof is discharged at its other end.

5. The process of claim 1, comprising the following stages:
(1) reacting aminonitriles or dinitriles and diamines or mixtures thereof, optionally together with further polyamide-forming monomers and/or oligomers with said aqueous medium in said reactor at a temperature of from 180 to 310° C. and a pressure of from 1 to $10 \times 10^6$ Pa to obtain a reaction mixture,
(2) further reacting said reaction mixture at a temperature of from 200 to 300° C. and a pressure which is lower than the stage 1 pressure, wherein said temperature and said pressure are chosen such that a first gas phase and a first liquid phase are obtained and said first gas phase is separated from said first liquid phase,
(3) admixing said first liquid phase with a gaseous or liquid phase comprising water or an aqueous medium at a temperature of from 200 to 300° C. and a pressure of from 0.1 to $30 \times 10^6$ Pa to obtain a product mixture.

6. The process of claim 5, additionally comprising the following stage:
(4) postcondensing the product mixture at a temperature from 200 to 280° C. and a pressure which is lower than the stage 3 pressure, if stage 3 is carried out, wherein the temperature and the pressure are chosen such that a second gaseous phase, which comprises water and ammonia, and a second liquid phase, which comprises the polyamide, are obtained.

7. The process of claim 5, wherein a metal oxide catalyst in the form of a fixed bed is utilized in stage 1 or in stage 3 or in both stage 1 and stage 3.

8. The process of claim 3, wherein the reaction product is removed from the bottom and ammonia formed and any further low molecular weight compounds formed and water are taken off overhead, wherein the reactor comprises at least two chambers arranged above one another in the longitudinal direction, wherein the chambers are separated from one another by liquid-tight bottom plates, every chamber is connected via a liquid overflow to the immediately underlying chamber and a liquid product stream is taken off via the liquid overflow of the bottommost chamber, the gas space above the liquid surface in every chamber is connected to the chamber located immediately above it by one or more guide tubes which opens, or which each open, into a gas distributor having openings for the exit of gas below the liquid surface, and is also provided with at least one guide plate which is arranged vertically around each gas distributor and whose upper end is below the liquid surface and whose lower end is above the liquid-tight bottom plate of the chamber and which divides each chamber into one or more spaces into which gas flows and one or more spaces into which gas does not flow.

9. The process of claim 1, wherein at least 50% by weight of the solids are lactams and cyclic oligomeric lactams having two to six ring members that are derived from the aminonitrile used.

10. The process of claim 1, wherein aqueous medium only is introduced into the reactor at the at least two different locations.

11. The process of claim 1, wherein a metal oxide catalyst in the form of a fixed bed is utilized in the reactor.

12. The process of claim 1, comprising the following stages:

(1) reacting aminonitriles or dinitriles and diamines or mixtures thereof, optionally together with further polyamide-forming monomers and/or oligomers with said aqueous medium in said reactor at a temperature of from 180 to 310 ° C. and a pressure of from 1 to $10 \times 10^6$ Pa to obtain a reaction mixture, (2) further reacting said reaction mixture at a temperature of from 200 to 300 ° C. and a pressure which is lower than the stage 1 pressure, wherein said temperature and said pressure are chosen such that a first gas phase and a first liquid phase are obtained and said first gas phase is separated from said first liquid phase, (3) postcondensing said first liquid phase at a temperature from 200 to 280 ° C. and at a pressure, wherein the temperature and the pressure are chosen such that a second gaseous phase, which comprises water and ammonia, and a second liquid phase, which comprises the polyamide, are obtained.

* * * * *